United States Patent [19]

Thackray

[11] Patent Number: 5,375,873
[45] Date of Patent: Dec. 27, 1994

[54] AUTOMOTIVE AIR SUSPENSION SYSTEM

[76] Inventor: Donald S. Thackray, 4031 Rundlehorn Drive N.E., Calgary, Alberta, Canada, T1Y 2K2

[21] Appl. No.: 202,632

[22] Filed: Feb. 28, 1994

[51] Int. Cl.⁵ ............................................. B60G 11/26
[52] U.S. Cl. ..................................... 280/712; 280/711; 280/713; 280/678
[58] Field of Search ............... 280/711, 712, 672, 688, 280/678, 683, 713

[56] References Cited

U.S. PATENT DOCUMENTS

| | | | |
|---|---|---|---|
| 2,752,424 | 9/1960 | Gouirand | 280/683 X |
| 2,755,099 | 7/1956 | Smith | 280/713 |
| 3,499,662 | 3/1970 | Paul | 280/712 |
| 3,510,149 | 5/1970 | Raidel | 280/712 |
| 3,692,325 | 9/1972 | Gouirand | 280/678 |
| 3,822,008 | 7/1974 | Gouirand | 280/713 X |
| 4,903,984 | 2/1990 | Kajiwara et al. | 280/712 |
| 4,923,210 | 5/1990 | Heider et al. | 280/712 X |

Primary Examiner—Mitchell J. Hill
Assistant Examiner—Christopher P. Ellis

[57] ABSTRACT

A conventional leaf spring suspension system as applicable to pick-up trucks, vans and motor homes produces a harsh ride and is unable to compensate for changes in vehicle ride height and quality brought about by uneven or heavy vehilcle loading conditions. A more effective suspension is achieved by incorporating air springs to compliment the existing leaf springs thus providing the ability to adjust ride height and hence, ride quality. This is accomplished by replacement of existing suspension components, such as shock absorbers, with, on the front suspension, an air spring and various attachment brackets and, on the rear, an air spring in combination with a sub-frame and torque arm linked cross beam, carried between which is a low pressure air spring.

5 Claims, 1 Drawing Sheet

AUTOMOTIVE AIR SUSPENSION SYSTEM

FIELD OF THE INVENTION

This invention relates to the field of automotive suspension systems; more specifically to a method and device for improving ride quality in respect to pick-up trucks, vans and motor homes.

BACKGROUND—DESCRIPTION OF KNOWN ART

The wheels and axles on automotive vehicles are suspended by springs that support the mass or weight of the vehicle. The springs absorb the road shock as the wheels encounter uneven road surface conditions and keep the jarring, up-and-down action of the axles from being transmitted to the vehicle frame and body.

Only the parts of the vehicle attached to the frame derive benefit from the spring action and are commonly referred to as "sprung" weight. "Unsprung" weight is the term used to describe those parts of the vehicle not protected by the spring action and subject to the full force of gravity, save protection offerred by the tires for the reduction of road shock. Front and rear axles are examples of "unsprung" weight parts. As "unsprung" weight increases, so does the roughness of the vehicle ride. For example, if unsprung weight equals sprung weight there is, in effect, no spring action. It is, therefore, desireable to maintain unsprung weight as a low percentage of overall vehicle weight.

The ride of a vehicle, then, depends for the most part on the spring action. Springs that are too soft allow too much movement of the axle while springs that are too stiff do not allow enough movement of the axle. in either case the result is poor vehicle ride quality.

The softness or stiffness of a spring is determined by its deflection rate, i.e., the force required to produce 25 mm of spring deflection. The ideal automotive spring is designed to have a substantially constant deflection rate over all operating conditions while remaining within the elastic limits of the spring material.

Ideals, however, are seldom possible and as a compromise to produce a satisfactory ride for a given vehicle type, relatively soft springs are utilized and complimented with shock absorbers which act as dampeners to control spring osscillation.

While the above described approach to automotive suspension system design is standard within the industry it is not devoid of shortcomings. For example, the combination of spring and shock absorber typically provides a satifactory ride quality but not the optimum ride quality for any given vehicle. Nor can the standard design accommodate changing vehicle loading conditions which, in the case of pick-up trucks and vans may vary significantly at differing times during normal use with the consequent variation in vehicle ride height and suspension geometry.

Over the years much inventive ingenuity has been applied to the resolution of these shortcomings. One such proposed solution is to be found in the air bag suspension. This system is comprised of an air filled, heavy rubber bag encased in a metal dome or girdle. The air bag replaces the conventional spring, is filled with compressed air—typically from an engine driven compressor—and supports the vehicle mass. As the vehicle wheels encounter bumps or holes in the road surface, th air in the bag further expands or compresses.

This sytem alleviates some of the shortcomings of the conventional suspension in that it is possible to vary, either manually or automatically, through a series of special level control valves, the riding qualities of the vehicle to compensate for heavy or uneven loading or to increase or decrease the vehicle ride height as te driver desires. The riding quality of the vehicle may be adjusted by altering the amount of air pressure in the bag.

Given the benefits to be derived from such air activated suspensions systems compared to the conventional suspension systems it comes as no surprise that the air system continues to attract the interest of inventors and examples of such systems may be readily found in the patent literature, such as Canadian patent numbers 971583 which issued to Lear Siegler inc. in July 1975; 9615 16 which issued to Dura Corp in January 1975, and U.S. Pat. No. 4,310,172 which issued to Claude, G. T. et al, in January 1982.

All such air activated systems heretobefore known are designed either as a direct replacement for conventional springs or are intended as a replacement for the conventional shock absorber and as such are utilized only with coil springs.

OBJECTS AND ADVANTAGES

It is an object, then, of the present invention to present a method and device for incorporating an air activated suspension component as a complimentary component for use in leaf spring supension systems, the result of which is the provision of better ride quality and ride control. Another object of the present invention is to provide a method of adjusting the ride height of that class of vehicles in which such adjustment means was previously not practical.

It is a further object of the present invention to increase the load carrying capacity of such vehicles; namely pick-up trucks, vans and motor homes.

SUMMARY

According to one aspect the invention relates to an air operated suspension system comprised of: an air spring means carried between an upper support means and a lower support means with said upper and lower support means detachably mountable to, at the upper end, the vehicle frame and, at the lower end, the vehicle axle housing.

According to another aspect the invention relates to an air operated suspension system comprised of: transverse frame means detachably mountable to existing frame rails; dual torque arm means detachably mountable to said transverse frame means and substantially horizontally disposed to said transverse frame means; cross beam means detachably mountable to one end of each of said torque arm means and detachably mountable at each outer end to existing leaf spring hanger brackets; and air spring means detachably mountable between said transverse frame means and said cross beam means and located substantially central within the confines of said transverse frame means and said cross beam means.

According to a third aspect the invention relates to a method for the incorporation of air springs to a conventional leaf spring suspension systems comprising the steps of: removal of existing shock absorbers; attachment of a transverse frame means to the underside of the existing vehicle chassis; attaching a cross beam means to said transverse frame means via dual torque arms means; removal of existing leaf spring hanger brackets from existing frame and reattachment of said hanger brackets to outer ends of said cross beam means; and inserting and securing an air spring means between said transverse frame means and said cross beam means such that said air spring means is substantially centrally located in respect to said transverse frame means, said cross beam means and the vehicle undercarraige.

DESCRIPTION

The invention will be described in greater detail with reference to the accompanying drawings, which illustrate a preferred embodiment of the invention, and wherein.

Figure 1:
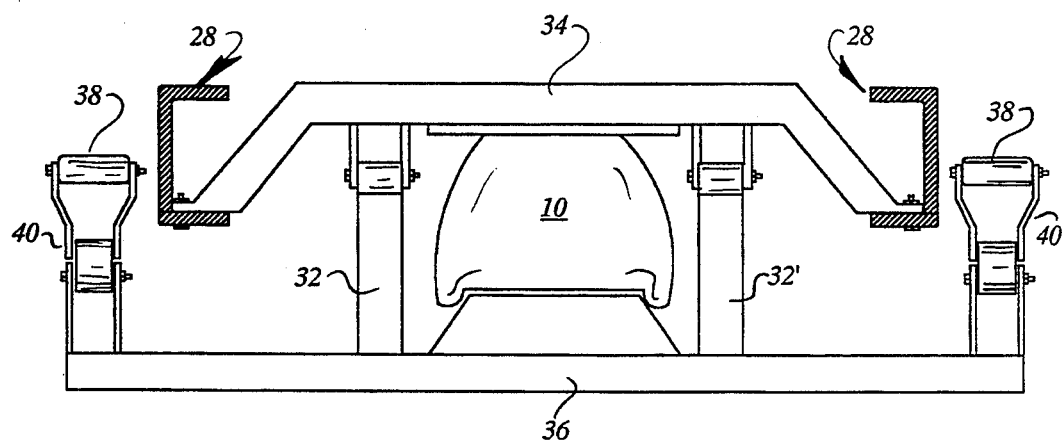
FIG. 1 is an end on view of the air suspension installed on the rear of a typical vehicle.

The air suspension system of the present invention is comprised of a conventional air spring 10 incorporating an air fill port 12 mounted at one end by conventional and appropriate means such as bolts to a generally "L" shaped upper bracket 14 of robust, rigid material incorporating dual rigid cross braces 18 and a plurality of substantially equally spaced frame mounting points 16 by which latter means the upper bracket 14 may be securely affixed to the vehicle frame 28 utilizing conventional and appropriate fastening means such as bolts and locknuts.

The air spring 10 is detachably affixed at its other end by conventional and appropriate means such as bolts to a generally "T" shaped lower bracket 20 of robust rigid material having toward the lower portion an integral and substantially flat U-bolt mounting plate 22 of robust rigid material and of dimensions sufficient to provide adequate strength and rigidity to accommodate the securing of a plurality of conventional and appropriate U-bolts 24 by which means the vehicle axle housing 26 is maintained in intimate contact with the underside of the front leaf spring 30 and, in turn, the lower bracket 20.

Figure 2:
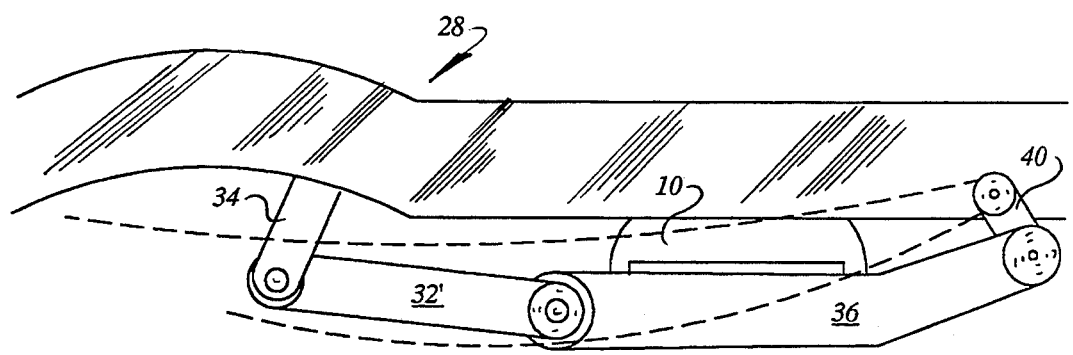
FIG. 2 is a side view of the air suspension system as depicted in FIG. 1.

Referring now to FIGS. 1 and 2 it may be seen that the device of the present invention is comprised of a generally inverted bowl shaped sub-frame structure 34 formed from rigid, robust material and detachably mountable in a fashion such that the distance between the existing vehicle frame rails 28 are traversed by affixing the sub-frame 34 at each of its outer extremities to the vehicle frame rails 28.

The sub-frame 34 further incorporates a plurality of demountable torque arm structures, 32 and 32' respectively, attached at one end to the underside of the sub-frame 34 via rubber bushing housings and cross bolts and disposed substantially horizontally to the sub-frame 34.

A cross beam structure 36 formed of rigid, robust material transversely and detachably mountable at each end to the existing leaf spring rear hanger brackets 40 and to the other end of each of the torque arm structures 32 and 32' respectively.

A low pressure air spring 10 of conventional design is detachably mounted, substantially central, at its upper end to the underside of the sub-frame 34 and, at its lower end, to the upper side of the cross beam 36.

The result is a support structure formed by the combination of the sub-frame 34 and the cross beam 36 with the cross beam 36 free to swivel substantially vertically within the limits imposed by the torque arm structures 32 and 32' respectively. The suspension system thus achieved compliments the existing leaf spring structure and absorbs substantially all of the road shock which would normally be transmitted to the vehicle chassis. The enhanced suspension system, then, substantially eliminates the ride harshness inherent to heavy duty leaf springs while retaining the original design strength of the leaf spring rated capacity.

The above description should not be construed as limiting the scope of the invention but rather as an illustration of the presently preferred embodiments and thus admits of a variety of modifications and changes without departure from the spirit of the invention.

I claim:

1. An air operated suspension system comprised of: transverse frame means detachably mountable to existing frame rails; dual torque arm means detachably mountable to said transverse frame means and substantially horizontally disposed to said transverse frame means; cross beam means detachably mountable to one end of each of said torque arm means and detachably mountable at each outer end to existing leaf spring hanger brackets; and air spring means detachably mountable between said transverse frame means and said cross beam means and located substantially central within the confines of said transverse frame means and said cross beam means.

2. The structure of claim 1 wherein said transverse frame means is comprised of a generally inverted bowl shaped structure of robust rigid material contoured to conform to the space restrictions imposed by the undercarraige of a vehicle and having a plurality of mounting points and brackets integral to said structure.

3. The structure of claim 1 wherein said torque arm means is comprised of an elongate structure of robust rigid material having, one at either end, an eyelet incorporating a rubber bushing.

4. The structure of claim 1 wherein said cross beam means is comprised of an elongate structure of rigid, robust material having a plurality of mounting points and rigid brackets integral to said structure.

5. A method for the incorporation of an air spring to a conventional leaf spring suspension system comprising the steps of: removal of existing shock absorbers; attachment of a transverse frame means to the underside of the existing vehicle frame; attaching a cross beam means to said transverse frame means using dual torque arms means; removal of existing leaf spring hanger brackets from the existing frame and reattachment of said hanger brackets to outer ends of said cross beam means; and inserting and securing an air spring means between said transverse frame means and said cross beam means such that said air spring means is substantially centrally located in respect to said transverse frame means, said cross beam means and the vehicle undercarraige.

* * * * *